(12) United States Patent
Mercier et al.

(10) Patent No.: US 6,675,455 B2
(45) Date of Patent: Jan. 13, 2004

(54) METHOD OF ASSEMBLING VEHICLE OPENING LEAVES

(75) Inventors: Jacky Mercier, Bonnee (FR); Pascal De Vries, Sandillion (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 10/105,643

(22) Filed: Mar. 25, 2002

(65) Prior Publication Data

US 2002/0144388 A1 Oct. 10, 2002

(30) Foreign Application Priority Data

Mar. 27, 2001 (FR) .......................................... 01 04 167

(51) Int. Cl.$^7$ .............................................. B23Q 17/00
(52) U.S. Cl. ................. 29/407.09; 29/407.1; 29/407.01
(58) Field of Search .......................... 29/407.09, 407.1, 29/434, 464, 407.01, 407.05; 49/400, 401; 296/194

(56) References Cited

U.S. PATENT DOCUMENTS 4,375,716 A    3/1983   Armstrong et al.

FOREIGN PATENT DOCUMENTS

DE    3726292    *   2/1989
FR    2765547    *   1/1999

* cited by examiner

*Primary Examiner*—John C. Hong
(74) *Attorney, Agent, or Firm*—Carlson, Gaskey & Olds

(57) ABSTRACT

The invention relates to a method of assembling an opening leaf with a vehicle chassis, comprising the steps of measuring geometric references on the contour of an opening in a vehicle chassis, supplying an opening leaf corresponding to the opening in the chassis, adjusting at least one hinge secured to the chassis and to the opening leaf, according to references measured on the opening, assembling the opening leaf with the chassis using the adjusted hinge. The invention allows a door to be assembled with a vehicle precisely and in a minimum number of steps.

19 Claims, 4 Drawing Sheets

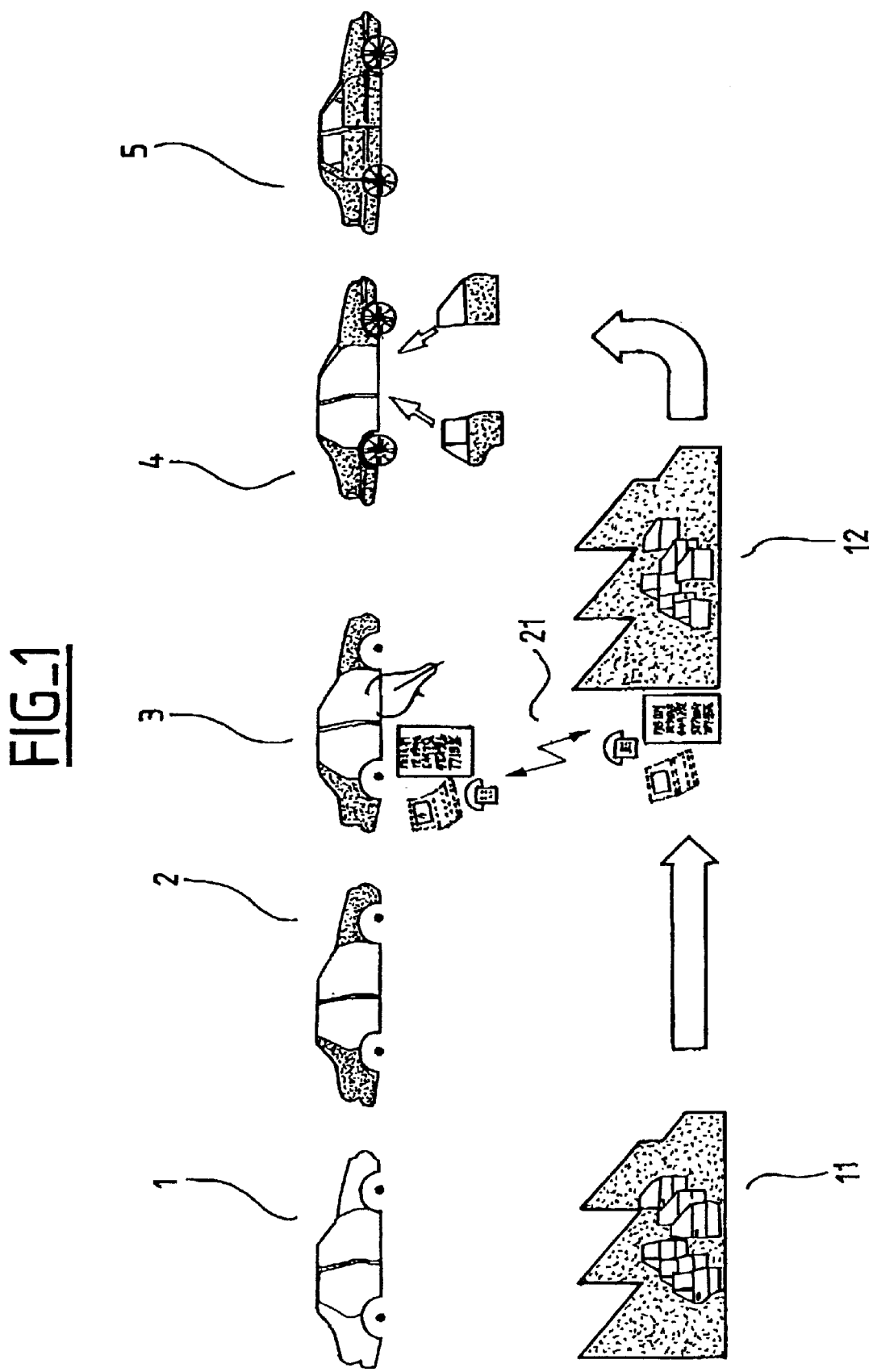
FIG_1

FIG_2
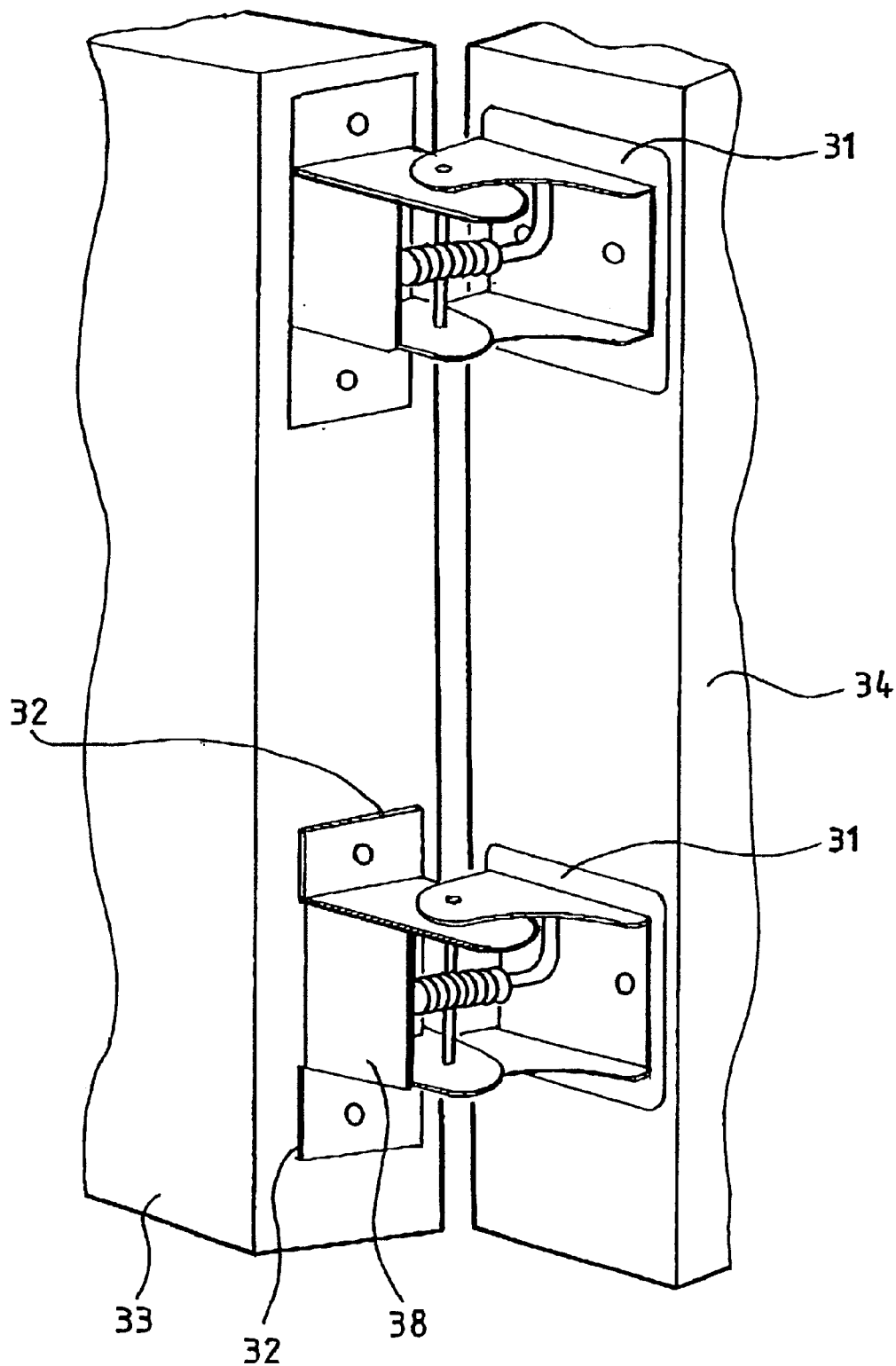

FIG_3
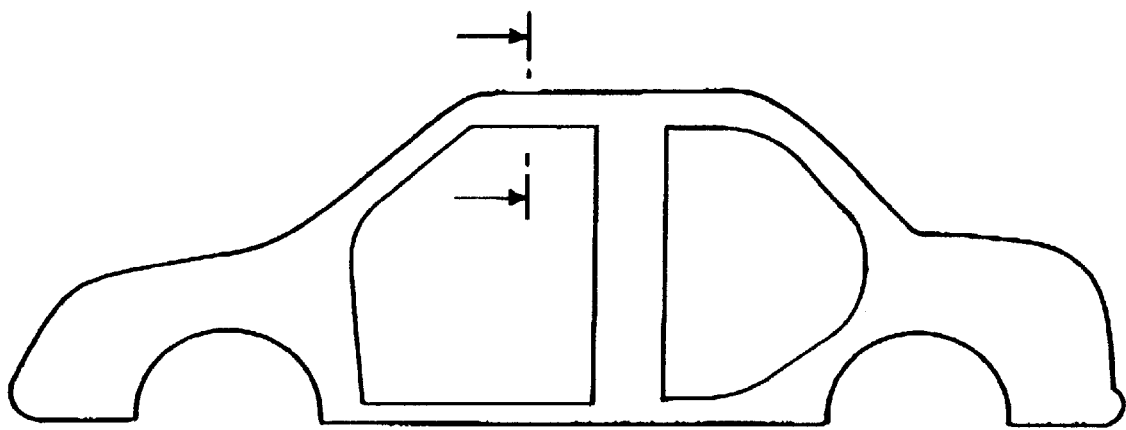
FIG_4
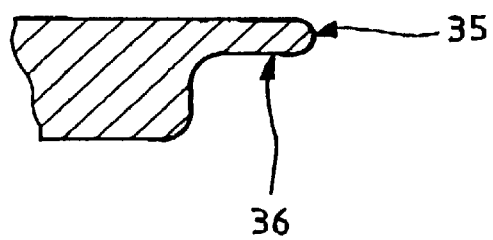

FIG_5
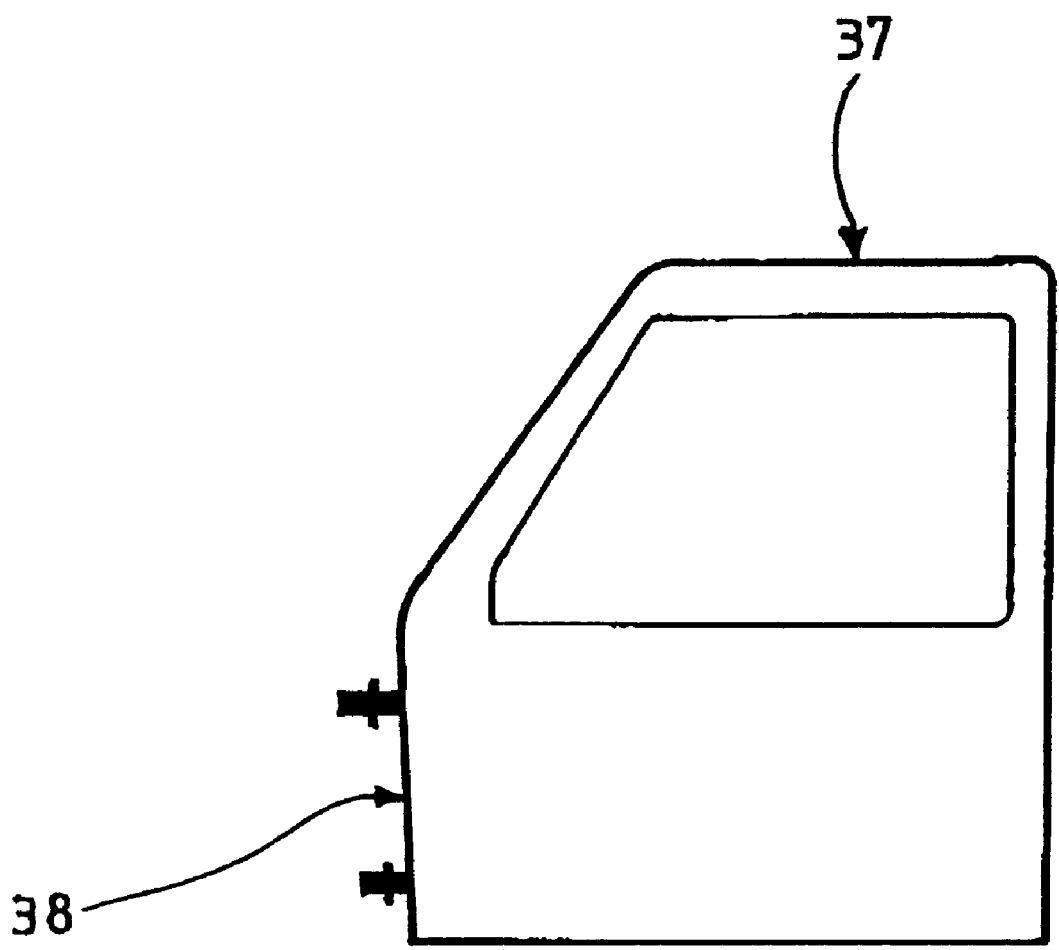

METHOD OF ASSEMBLING VEHICLE OPENING LEAVES

TECHNICAL FIELD

The invention relates to a method of assembling vehicle opening leaves, such as doors. The invention relates also to an opening leaf manufactured according to this method and to a vehicle having an opening leaf manufactured according to this method.

BACKGROUND OF THE INVENTION

An opening leaf, such as a door, is generally attached to the chassis of a vehicle by a hinge placed at one of its ends. When an opening leaf is being assembled with the chassis of a vehicle, it is important that the opening leaf be adjusted precisely in the corresponding opening in the vehicle chassis. More specifically, it is important to the appearance of the vehicle that the opening leaf be adjusted in such a way that the edge of the opening leaf be parallel to the perimeter of the corresponding opening in the chassis.

Adjusting the opening leaf with respect to the corresponding opening in the chassis is conventionally performed using opening-leaf hinges which are adjustable in several directions, or by deforming the opening leaf prior to a painting step.

According to one method, used, for example, for the manufacture of the 1988 model-year Peugeot 205 (trade names) at the Mulhouse site, the opening leaf is assembled and adjusted on the chassis at the start of vehicle manufacture. The opening leaf is, in particular, assembled prior to the steps of painting and of fitting components of the opening leaf, such as the window lifters, cavities or interior panels. The opening leaf therefore remains assembled with the vehicle until the end of vehicle manufacture. However, this method has disadvantages. The assembled opening leaf is an impediment to the fitting of equipment to the vehicle or to the opening leaf itself. The opening leaf may furthermore become damaged or scratched during the vehicle manufacturing process. The opening leaf has, in this case, to be removed and repaired or changed, and this is expensive and may disrupt the vehicle production line.

According to another method, used, for example, for the manufacture of the 2000 model-year mark IV Volkswagen Golf (trade names) at the Brussels plant, the opening leaf is assembled and adjusted on the vehicle. The opening leaf is then painted, then removed from the vehicle. The vehicle and the opening leaf are then equipped separately. The equipped opening leaf is then assembled with the vehicle once again. However, the painted and equipped opening leaf is generally markedly heavier than it was when it was initially fitted. The increasing complexity of opening leaves makes this problem increasingly pronounced. The adjustment of the opening leaf with respect to the opening in the vehicle has therefore to be corrected. This method thus dictates a significant number of operations. This method also complicates the logistics of the manufacturing unit and economically dictates that the vehicle manufacturing line and the opening-leaf manufacturing line be located at the same site. The increasing complexity of opening leaves, however, also dictates the use of a correspondingly specialist manufacturing line, for example that of a subcontractor, which often already exists and cannot be sited at the vehicle manufacturing site.

Document U.S. Pat. No. 4,375,716 describes a method of adjusting hinges with respect to an opening leaf and of adjusting a hinge mounting plate on a chassis panel. In this method, a chassis panel is placed in a jig. Pins are placed in bores of the panel and hinge mounting plates are attached, by positioning them over the pins. The mounting plates have a screw thread for attaching a hinge. The mounting plates are moved around to position their respective screw thread at a predetermined point with respect to the jig. The mounting plate is then welded to the panel. Elsewhere, hinges are placed on another jig. The hinges are moved around until their axis is positioned at a predetermined point with respect to the jig. An opening leaf is then placed on the jig, then the opening leaf is welded onto the hinges. This method does, however, entail a significant amount of tooling. The positioning of the mounting plates with respect of the jigs is also imprecise and this may lead to misalignment between the opening leaf and the corresponding opening in the chassis.

SUMMARY OF THE INVENTION

There is therefore a need for a method of assembling an opening leaf that alleviates these drawbacks. The invention thus proposes a method of assembly which solves one or more of these drawbacks. More specifically, the invention relates to a method of assembling an opening leaf with a vehicle chassis, comprising the steps of measuring geometric references on the contour of an opening in a vehicle chassis, supplying an opening leaf corresponding to the opening in the chassis, adjusting at least one hinge secured to the chassis and to the opening leaf, according to references measured on the opening, assembling the opening leaf with the chassis using the adjusted hinge.

In an alternative form, it further comprises a step of measuring geometric references on the opening leaf, prior to the adjusting of the hinge, and adjusting of the hinge is also performed according to references measured on the opening leaf.

According to another alternative form, the measuring of geometric references of the opening comprises measuring geometric references on a hinge mounting plate secured to the chassis.

According to yet another alternative form, the measuring of geometric references on the chassis is formed after a step of painting the chassis.

According to another alternative form still, the measuring of geometric references on the chassis is performed on the vehicle manufacturing line.

According to one feature, the method comprises sending measured geometric references of the opening from the vehicle manufacturing line to the opening-leaf manufacturing line, prior to the adjusting of the hinge.

According to another feature, the opening-leaf manufacturing site is remote from the vehicle manufacturing site.

According to an alternative form, the method comprises sending measured geometric references of the opening from the vehicle manufacturing site to the opening-leaf manufacturing site, prior to the adjusting of the hinge.

According to another alternative form, the method comprises sending measured geometric references of the opening at the same time as characteristics of the opening leaf that is to be manufactured.

According to yet another alternative form, the opening leaf is a door.

According to another alternative form still, measuring geometric references of the opening comprises measuring geometric references on the top edge of the opening.

In an alternative form, measuring geometric references of the door comprises measuring geometric references on the upper edge of the door.

In another alternative form, the method further comprises a step of extrapolating a geometric shape from the measurements.

In yet another alternative form, the hinge is secured to the opening leaf prior to adjustment.

In another alternative form still, the hinge is secured to a reference jig prior to adjustment.

It is possible to provide that measuring geometric references of the opening leaf is performed after opening-leaf equipment has been fitted.

According to an alternative form, measuring geometric references of the opening leaf is performed after a step of painting the opening leaf.

According to another alternative form, adjustment comprises the fitting of shims prior to the securing of the hinge to the chassis or to the opening leaf.

According to yet another alternative form, adjusting the hinge is carried out in such a way that at least one edge of the opening leaf is more or less parallel with one edge of the opening.

According to another alternative form still, assembling the opening leaf with the chassis is performed at the end of vehicle manufacture.

In another alternative form, the method further comprises a step of testing the adjustment of the hinge after the opening leaf has been assembled with the chassis.

BRIEF DESCRIPTION OF THE DRAWINGS

Other feature and advantages of the invention will become apparent from reading the description which follows of some embodiments of the invention, which description is given by way of example and with reference to the appended drawings in which:

FIG. 1 shows a depiction of various steps in a method according to the invention of assembling an opening leaf, FIG. 2 shows a perspective depiction of opening-leaf hinges; and FIGS. 3, 4 and 5 depict examples of measurement zones on the opening leaf and on the chassis.

DETAILED DESCRIPTION OF THE PREFERRED EMBODIMENT

The invention proposes a method of assembling an opening leaf with a vehicle chassis, in which method the geometry of an opening is measured. A hinge which is supposed to secure an opening leaf to the opening is then adjusted according to the measurements. An opening leaf is assembled at the measured opening using the adjusted hinge.

FIG. 1 shows several steps in an example of a method according to the invention, of assembling an opening leaf. During a first step 1, a chassis or an element of a chassis of a vehicle is brought in. A second step 2 of painting the chassis may be performed. In step 3, geometric references are measured on the contour of an opening in the chassis. Vehicle opening leaves are supplied, incidentally, at a step 11. At a step 21, the measured geometric references are communicated to the opening-leaf manufacturing or assembly line. One or more hinges are assembled with the opening leaf at a step 21. At least one hinge is adjusted according to the geometric references measured on the contour of the opening in step 12. In a step 4, the opening leaf is assembled, via the adjusted hinges, with the chassis at the measured opening. An assembled vehicle is then supplied at a step 5.

Step 3 of measuring geometric references makes it possible to obtain geometric characteristics about an opening in the chassis of the vehicle. These geometric characteristics make it possible, for example, to determine a specific curve of one or more contours of an opening of each chassis.

An opening leaf to be assembled with the chassis at the measured opening is supplied at step 11. In step 12, a hinge 38, such as one of those depicted in FIG. 2, is adjusted according to the measurements of the geometric references of the opening. Thus, the adjusting of the hinge 38 is dependent on the particular geometry of the opening to which it and the opening leaf correspond. The adjustment is therefore dependent on each part that is to be assembled and dependent on the spread on shapes between the edges of the openings of the various vehicles manufactured, for more precise positioning with respect to the corresponding opening leaves.

The hinge 38 is assembled with the opening leaf 33 and with the chassis 34. The hinge 38 thus secures the opening leaf 33 to the chassis 34. Because of the adjustment of the hinge 38, the opening leaf 33 is positioned precisely with respect to the contour of the opening in the chassis 34, according to predefined positioning criteria.

The method may also comprise a step of measuring geometric references on a hinge mounting plate 31 fixed to the chassis of the vehicle. Specifically, provision may be made for a hinge 38 to be assembled with such a mounting plate 31, for example having high rigidity or tight geometric tolerances. The hinge 38 may then be adjusted according to the geometry of this mounting plate 31. The precision with which the hinge 38 is adjusted is then increased.

The measurements of the geometric references of the chassis 34, for example on the opening or on a mounting plate 31, are preferably taken on the vehicle manufacturing line. These measurements thus do not delay the manufacture or assembly of the vehicle.

The method may also comprise a step of measuring geometric references on the opening leaf 33. The hinge 38 can therefor be adjusted according to the particular geometry of the opening leaf 33 and of the opening. The adjustment is all the more precise and the actual position of the opening leaf is therefore all the closer to the desired position.

Measurements can be performed using conventional metrology or observation means, for example feelers, measurements by interferometry, processed pictures or laser measurements. These measurement means may be automated on a manufacturing line. They may, for example, be mounted on robots.

The method may just as easily comprise one or more steps of extrapolating the measurements. This step may, for example, make it possible to employ numerical processing means for carrying out automatic adjustment or to allow the edge of an opening leaf to be viewed superposed on the edge of an opening in a chassis, which edges need to be positioned relative to one another. Any operator present may then, in the last instance, adjust the hinge according to the relative position of displayed geometric elements. It is, for example, possible to generate models of geometric shapes from the measurements. It is possible, for example, to plot a curve corresponding to the edge of an opening in the chassis or of the opening leaf and it is also possible to trace a surface or a volume corresponding to a mounting plate on the chassis or any other useful geometric element.

The vehicle manufacturing line may be remote from the opening-leaf manufacturing site. It is thus possible to use existing vehicle and opening-leaf manufacturing sites. This may also facilitate vehicle manufacture, as the manufacture of the vehicle is not disrupted by the manufacture of the opening leaves.

Particularly in the case where the manufacturing sites are remote from one another, it may be sensible to send the geometric references measured on the opening or the chassis from the vehicle manufacturing site to the opening-leaf manufacturing site prior to the adjusting of the hinge. The adjusting of the hinge may thus be carried out in parallel or at the same time during manufacture of the vehicle or of its chassis.

According to an alternative form, geometric references are sent to the opening leaf manufacturing site at the same time as characteristics of the opening leaf 33 that is to be manufactured. These characteristics may relate to the color of the opening leaf 33, to the opening-leaf equipment options or to the delivery schedules for this opening leaf 33. The simultaneous sending of all this data allows more practical and more effective control of this data. This type of sending may make it possible to form a kind of database regarding the opening leaf 33, which may be appreciable in terms of quality control.

More specifically in the case of a door, but also in the case of other opening leaves, it is possible to use the parallelism between the curve formed by the upper edge of the opening in the chassis 34 and the curve formed by the upper edge of the door as a positioning criterion. What happens is that these zones are generally situated at user eye level and a lack of parallelism is readily detected by a user.

The positioning criterion may relate to the parallelism of the opening leaf 33 and of the opening along the axis of the car when looking at the car from above. Another criterion is the parallelism between the opening and the opening leaf in the axis of the car when looking at the car from the side. Other criteria such as the parallelism between the front, rear or bottom edges of the opening leaf and of the opening may be used. Another criterion that can be used for positioning may be the distance between the edges of the opening leaf and of the opening. Other appropriate criteria may of course also be used.

FIGS. 3, 4 and 5 depict examples of measurement zones on the opening leaf 33 and on the chassis 34. It is thus possible to measure the location of points on an outer edge 35 of an opening in the chassis 34 with respect to a given reference. This type of measurement makes it possible, for example, to adjust the hinge 38 in such a way that the opening leaf 33 and the opening are parallel when looking at the vehicle from above. It is also possible to measure the location of points on an inner edge 36 of an opening. This type of measurement makes it possible, for example, to adjust the hinge in such a way that the opening leaf and the opening are parallel when looking at the vehicle from the side.

It is also desirable to measure points on the upper edge 37 or on the hinge-side edge of the opening leaf. Alignment of these edges is actually important in the positioning of the opening leaf 33 with respect to the chassis 34.

The hinges 38 may be adjusted by any appropriate means. It is thus possible to use adjustable hinges 38 known to those skilled in the art. It is also possible to use hinges 38 such as those depicted in FIG. 2. In this example, shims 32 arranged between the opening leaf 33 and the hinge 38 are used to adjust their relative positions. It is thus possible to cause the opening leaf 33 to pivot with respect to the hinge 38. As appropriate, shims 32 may be placed on just one or on both hinges 38 of the opening leaf 33. The shims 32 may also be inserted between the chassis 34 and the hinge 38. It is also possible to provide drillings in the hinges 38, the dimensions of the drillings being larger than the dimensions of the screws used to secure the hinge 38 to the opening leaf 33. The opening leaf 33 can then also be made to pivot with respect to the hinge 38, before their relative positions are fixed. It is then possible to tighten the fixing screws in order to maintain the hinge adjustment. Pivoting can then also be performed about another axis. It is also possible to imagine adjusting the hinge by adjusting an axis of articulation of the hinge or by machining a face for the fixing of the hinge 38 to the opening leaf 33 or to the chassis.

It is possible to assemble the hinge 38 with the opening leaf 33 prior to adjusting the hinge 38 and preferably after fitting all the equipment on the opening leaf 33. The hinge 38 is also preferably adjusted after all the opening-leaf equipment has been fitted. It is thus possible for the hinge 38 to be adjusted according to an equipped opening leaf 33 whose weight with equipment may be markedly higher than the weight of a simple opening-leaf structure. The adjustment of the hinge will thus be more precise and will probably not need to be tweaked.

Although an adjustment of the hinge 38 on the opening-leaf manufacturing site has been described, it is of course possible for this adjustment to be carried out on the vehicle manufacturing site, for example according to geometric reference measured on the opening leaf. It is, however, preferable, in the above case, to adjust the hinge on the opening-leaf manufacturing site.

Particularly in the case where measurements are to be made on the edge of the opening leaf 33, it is desirable, prior to taking the measurements and carrying out the adjustment, to fix the hinge to a jig and to the opening leaf. The measurement will thus be made with respect to a predetermined frame of reference and its precision will therefore be better.

It is also desirable to position the chassis 34 or the vehicle in a predetermined reference position prior to measuring the references of the opening.

It is also desirable for a step of painting the opening leaf 33 to be carried out before the geometry of the opening leaf 33 is measured, if appropriate. As the weight of the paint work is not insignificant, subsequent adjustment of the hinge 38 is thus more precise.

The geometric references of the opening are also measured preferably after a step of painting the chassis 34 or a panel exhibiting the openings.

It is also possible to imagine that the opening leaf 33 on the chassis be painted simultaneously, without assembling the opening leaf 33 with the chassis 34 beforehand.

It is also desirable for assembly of the opening leaf 33 with the chassis 34 by means of the adjusted hinge 38 to be performed at the end of the vehicle manufacturing process. Thus, the opening leaf 33 does not impede the assembly and manufacture of the vehicle and there is also no risk of the opening leaf 33 becoming damaged.

The method may also involve an optional step of testing the adjustment of the hinge, preferably after the opening leaf 33 has been assembled with the chassis 34.

Of course, the present invention is not restricted to the examples and embodiments described and depicted, but can be varied in numerous ways accessible to those skilled in the art. Thus, although the invention has been described using a door, the invention also relates to all types of opening leaf, such as hoods, tailgates or trunk lids.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method of assembling an opening leaf with a vehicle chassis, comprising the steps of:

measuring geometric references an a contour of an opening in the vehicle chassis;

supplying the opening leaf corresponding to the opening in the chassis;

measuring geometric references of the opening leaf after opening leaf equipment has been fitted;

adjusting at least one hinge to be secured to the chassis and to the opening leaf, according to references measured on the opening and on the opening leaf; and assembling the opening leaf with the chassis using at least one adjusted hinge.

2. The method of assembly of claim 1, wherein the step of measuring geometric references of the opening includes measuring geometric references on a hinge mounting plate secured to the chassis.

3. The method of assembly of claim 1, wherein the step of measuring geometric references on the opening occurs after a step of painting the chassis.

4. The method of assembly of claim 1, wherein the step of measuring geometric references on the opening is performed on a vehicle manufacturing line.

5. The method of assembly of claim 4, further including the step of sending measured geometric references of an opening from the vehicle manufacturing line to an opening leaf manufacturing line, prior to the step of adjusting of at least one hinge.

6. The method of assembly of claim 1, wherein an opening leaf manufacturing site is remote from a vehicle manufacturing site.

7. The method of assembly of claim 6, wherein the step of sending measured geometric references of the opening from the vehicle manufacturing site to the opening leaf manufacturing site is prior to the step of adjusting said at least one hinge.

8. The method of assembly of claim 6, wherein sending measured geometric references of the opening occurs at the same time as a step of manufacturing of the opening loaf.

9. The method of assembly of claim 1, wherein the opening leaf is a door.

10. The method of assembly of claim 9, wherein the step of measuring geometric references of the opening includes measuring geometric references on a top edge of the opening.

11. The method of assembly of claim 9, wherein the stop of measuring geometric references of the door comprises measuring geometric references on an upper edge of the door.

12. The method of assembly of claim 1, further including the step of extrapolating a geometric shape from the step of measuring geometric references on the opening leaf.

13. The method of assembly of claim 1, wherein the hinge is secured to the opening leaf prior to the step of adjusting said at least one hinge.

14. The method of assembly of claim 13, wherein the hinge is secured to a reference jig prior to the step of adjusting said at least one hinge.

15. The method of assembly of claim 1, wherein the step of measuring geometric references of the opening leaf is performed after a step of painting the opening leaf.

16. The method of assembly of claim 1, wherein the step of adjusting said at least one hinge includes the fitting of shims prior to the step of assembling.

17. The method of assembly of claim 1, wherein the step of adjusting said at least one hinge includes aligning at least one edge of the opening leaf to be substantially parallel with an edge of the opening.

18. The method of assembly of claim 1, wherein the step of assembling the opening leaf with the chassis is performed after vehicle manufacture.

19. The method of assembly of claim 1, further including the step of testing the adjustment of the hinge after the opening leaf has been assembled with the chassis.

\* \* \* \* \*

UNITED STATES PATENT AND TRADEMARK OFFICE
CERTIFICATE OF CORRECTION

PATENT NO. : 6,675,455 B2
DATED : January 23, 2004
INVENTOR(S) : Mercier et al.

It is certified that error appears in the above-identified patent and that said Letters Patent is hereby corrected as shown below:

<u>Column 7,</u>
Line 13, "references an a" should read -- references on a --.
Line 20, delete "," after "leaf" and before "according".
Line 35, "an" should read as -- the --

Signed and Sealed this

Eighteenth Day of May, 2004

JON W. DUDAS
*Acting Director of the United States Patent and Trademark Office*